US009829044B2

(12) United States Patent
Clark et al.

(10) Patent No.: US 9,829,044 B2
(45) Date of Patent: Nov. 28, 2017

(54) SPHERICAL BEARING WITH ANNULAR SEAL HAVING AN AUXILIARY SEAL LEG EXTENDING THEREFROM

(71) Applicant: ROLLER BEARING COMPANY OF AMERICA, INC., Oxford, CT (US)

(72) Inventors: D'Artagnan Clark, Meriden, CT (US); James Voisine, Burlington, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 0 days.

(21) Appl. No.: 14/967,541

(22) Filed: Dec. 14, 2015

(65) Prior Publication Data

US 2016/0169284 A1    Jun. 16, 2016

Related U.S. Application Data

(60) Provisional application No. 62/091,928, filed on Dec. 15, 2014.

(51) Int. Cl.

| F16C 33/74 | (2006.01) |
|---|---|
| F16C 23/04 | (2006.01) |
| F16J 15/3204 | (2016.01) |
| F16J 15/3276 | (2016.01) |
| F16C 11/06 | (2006.01) |
| F16C 17/10 | (2006.01) |
| F16C 23/08 | (2006.01) |

(52) U.S. Cl.
CPC .......... *F16C 33/74* (2013.01); *F16C 11/0671* (2013.01); *F16C 17/10* (2013.01); *F16C 23/045* (2013.01); *F16C 23/082* (2013.01); *F16J 15/3204* (2013.01); *F16J 15/3276* (2013.01); *F16C 23/084* (2013.01); *F16C 23/086* (2013.01); *F16C 2326/20* (2013.01)

(58) Field of Classification Search
CPC .............. F16C 11/0666; F16C 11/0671; F16C 11/0676; F16C 33/74; F16J 15/3204; F16J 15/3276
See application file for complete search history.

(56) References Cited

U.S. PATENT DOCUMENTS

| 3,848,938 A | 11/1974 | Stella et al. |
|---|---|---|
| 4,249,782 A | 2/1981 | Frank |
| 4,331,367 A | 5/1982 | Trudeau et al. |
| 4,768,889 A | 9/1988 | Loser et al. |

(Continued)

FOREIGN PATENT DOCUMENTS

| CN | 101300428 A | 11/2008 |
|---|---|---|
| CN | 204025369 U | 12/2014 |

(Continued)

OTHER PUBLICATIONS

Extended European Search Report issued in corresponding European Application No. 115199806.9 dated May 19, 2016, pp. 1-8.

*Primary Examiner* — James Pilkington
(74) *Attorney, Agent, or Firm* — Murtha Cullina LLP (57) ABSTRACT

A seal for a spherical bearing has an annular body portion having an arcuate cross section extending between a first axial end and a second axial end. The second axial end is positioned radially outward from the first axial end. The seal includes retaining ring positioned proximate the second end. The seal includes a scraper seal extending radially inward from the second end.

13 Claims, 14 Drawing Sheets

(56) References Cited

U.S. PATENT DOCUMENTS

| | | |
|---|---|---|
| 5,066,159 A | 11/1991 | Urbach |
| 5,242,228 A | 9/1993 | Hattori |
| 6,626,575 B2 | 9/2003 | Hartl |
| 6,685,377 B2 | 2/2004 | Nakata et al. |
| 7,481,595 B2 | 1/2009 | Urbach |
| 7,568,840 B2 | 8/2009 | Smith et al. |
| 8,690,690 B2 | 4/2014 | Conger et al. |
| 8,783,953 B2 | 7/2014 | Voisine et al. |
| 8,967,868 B2 | 3/2015 | Wright |
| 2007/0110510 A1 | 5/2007 | Holmes et al. |
| 2007/0122232 A1 | 5/2007 | Buchner et al. |
| 2010/0054851 A1 | 3/2010 | Bohne et al. |
| 2010/0119297 A1 | 5/2010 | Langendoen |
| 2010/0260538 A1* | 10/2010 | Brunneke ........... F16C 11/0671 403/134 |
| 2011/0293360 A1 | 12/2011 | Becker et al. |
| 2012/0128282 A1* | 5/2012 | Voisine ................. F16C 23/046 384/145 |
| 2013/0045040 A1 | 2/2013 | Ginn et al. |
| 2014/0016888 A1 | 1/2014 | Harper et al. |
| 2014/0021394 A1 | 1/2014 | Street et al. |
| 2014/0093198 A1 | 4/2014 | Voisine |
| 2015/0226256 A1 | 8/2015 | Voisine |

FOREIGN PATENT DOCUMENTS

| | | | |
|---|---|---|---|
| DE | 19834678 | * | 2/2000 |
| EP | 2905486 A2 | | 8/2015 |
| FR | 2219347 A1 | | 9/1974 |
| JP | 07260066 | | 10/1995 |
| JP | 11201137 A | | 7/1999 |
| JP | 2009063035 A | | 3/2009 |
| JP | 2014523509 A | | 9/2014 |
| WO | 2008074063 A1 | | 6/2008 |
| WO | 2014089434 A1 | | 6/2014 |

* cited by examiner

SPHERICAL BEARING WITH ANNULAR SEAL HAVING AN AUXILIARY SEAL LEG EXTENDING THEREFROM

CROSS REFERENCE TO RELATED APPLICATIONS

This patent application claims the benefit of U.S. Provisional Patent Application Ser. No. 62/091,928, filed on Dec. 15, 2014, which is hereby incorporated by reference in its entirety.

FIELD OF THE INVENTION

The present invention relates generally to a seal for a spherical bearing, and more particularly to a spherical bearing having an annular seal that is secured in place via a first and second retaining ring and includes an auxiliary seal leg in the form of a scraper seal extending therefrom.

BACKGROUND OF THE INVENTION

Spherical plain bearing assemblies typically comprise a ball positioned for rotational movement in an outer ring. The ball defines an outer surface, and the outer ring defines an inner surface contoured to receive and retain the ball therein such that the outer surface of the ball is in sliding engagement with the inner surface of the outer ring. Contamination of the sliding engagement surfaces, namely, the outer surface of the ball and the inner surface of the outer ring, is one of the leading causes of bearing damage. Typically, the spherical plain bearing assembly includes a single sealing arrangement on opposing sides thereof, wherein a seal is provided in a single groove for retaining lubrication between the sliding engagement surfaces and for inhibiting the ingress of dirt, water, particulate matter, and other contaminants to the sliding engagement surfaces.

For example, a single SpreadLock® type seal is positioned in each single groove positioned on opposing sides of a spherical bearing, as described in U.S. Pat. No. 6,626,575, the subject matter of which is incorporated herein by reference. Typically, a single groove on each of opposing sides of the spherical bearing was employed to minimize the axial dimensions of the bearing while maximizing the load bearing capability of and sliding engagement between, the outer surface of the ball and the inner surface of the outer ring. Thus, use of more than one groove or seal per bearing side was not considered.

However, some seals do not keep all contaminants out of the bearing and can impair motion of the inner member relative to the outer member. In addition, movement of the inner member relative to the outer member can cause the seal to become dislodged. A means of preventing contaminant entry that would not impair relative motion of the inner member and the outer member, would better keep contaminants out of the bearing and would not allow the seal to be dislodged has long been sought in the industry.

SUMMARY OF THE INVENTION

In one aspect, the present invention resides in a seal for a spherical bearing. The seal includes an annular body portion having an arcuate cross section extending between a first axial end and a second axial end, the second axial end being positioned radially outward from the first axial end. The seal includes a first retaining ring positioned proximate the second axial end; and a scraper seal extending radially inward from the second axial end.

In another aspect, the present invention resides in a spherical bearing. The spherical bearing includes an outer ring defining a spherical radially inner facing surface defining a cavity in the outer ring and an inner ring defining a spherical exterior surface. The inner ring is positioned at least partially in the cavity. The bearing includes a seal extending between the inner ring and the outer ring. The seal includes an annular body portion having an arcuate cross section extending between a first axial end and a second axial end, the second axial end being positioned radially outward from the first axial end. The seal includes a first retaining ring positioned proximate the second axial end; and a scraper seal extending radially inward from the second axial end.

A seal for a spherical bearing includes an annular body portion having an arcuate cross section extending between a first axial end and a second axial end, the second axial end being positioned radially outward from the first axial end; a first retaining ring embedded in the first axial end; and a second retaining ring positioned proximate the second end. In one embodiment, the seal includes the first retaining ring has a rectilinear cross section and is covered with an elastomeric material such as nitrile. In one embodiment, the annular body portion comprises an elastomeric material such as nitrile. In one embodiment, the second end comprises an elastomeric material such as nitrile. In one embodiment, the second retaining ring has an L-shaped cross section defined by an elongate first leg extending radially outward and a second leg extending axially outward from the first leg, the first leg being seated in a base portion of the second end. In one embodiment, the base portion is positioned radially outward from the first leg. In one embodiment, the second retaining ring has a C-shaped cross section, defined by a first L-shaped leg and a second L-shaped leg coupled to one another by a web, the second retaining ring having a receiving area between the first L-shaped leg and a second L-shaped leg. In one embodiment, the first retaining ring has a circular cross section and comprises an elastomeric material. In one embodiment, the second retaining ring has a J-shaped cross section defined by an elongate first leg extending radially outward and transitioning into an axially directed second leg and a third leg extending radially inward from the second leg. In one embodiment, the second retaining ring has an L-shaped cross section defined by an elongate first leg extending radially outward and transitioning into an axially directed second leg. In one embodiment, the second retaining ring has a L-shaped cross section defined by an elongate first leg extending radially outward and transitioning into an axially directed second leg and a third leg extending angularly inward from the second leg.

DETAILED DESCRIPTION

Figure 1A:
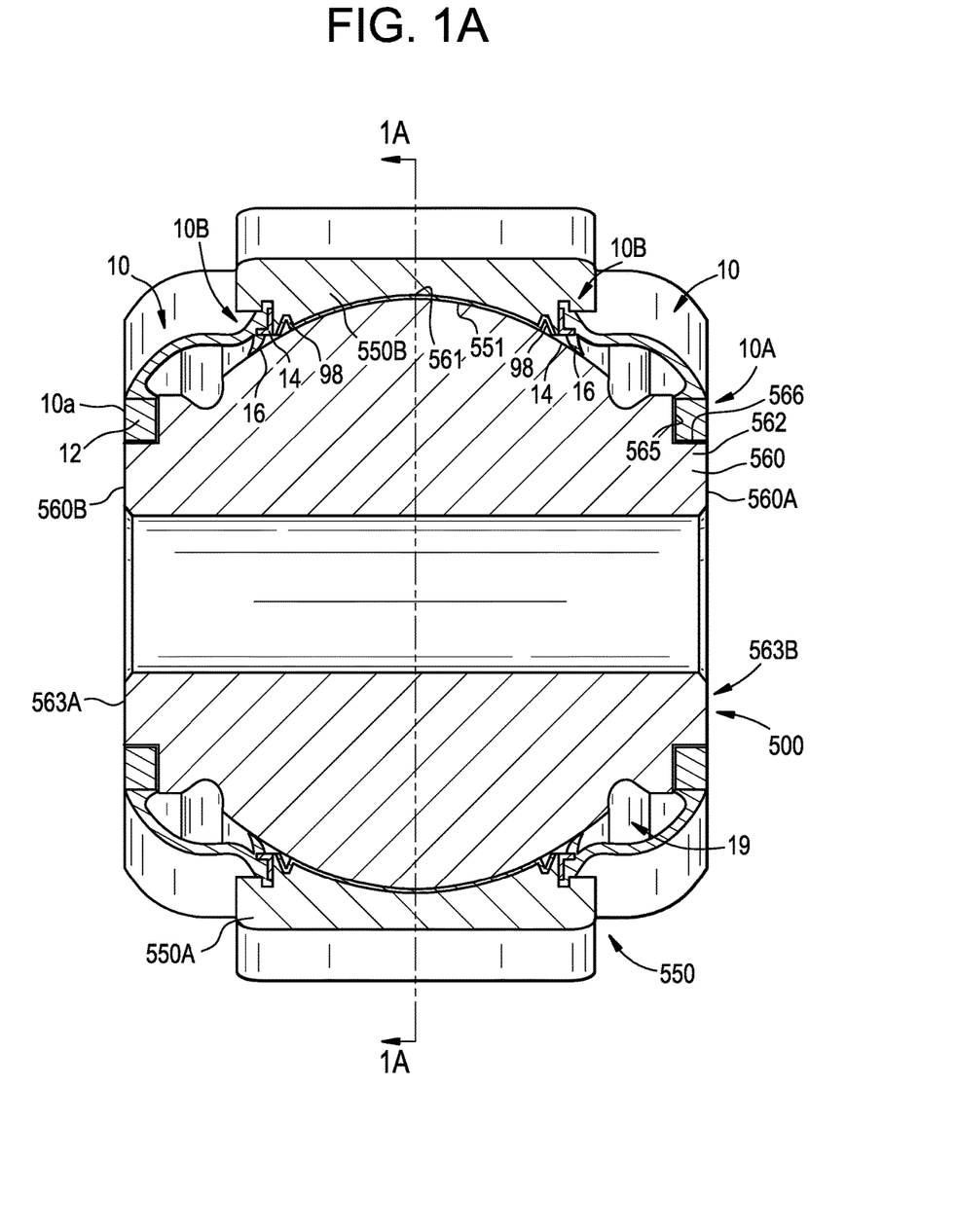
FIG. 1A is a cross sectional view of a spherical bearing having seals according to the present invention installed therein.
Figure 1B:
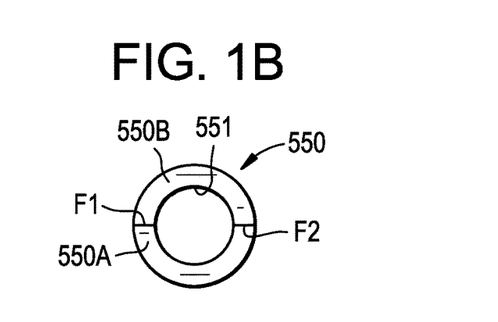
FIG. 1B is a side cross sectional view of the outer ring of FIG. 1A, taken across line 1A-1A.

As shown in FIG. 1A, a spherical bearing is generally designated by the numeral 500. The spherical bearing 500 has an inner ring 560 disposed partially in an outer ring 550. A seal 10 (e.g., a seal having triangular cross section) extends between the inner ring 560 and the outer ring 550 and defines a cavity 19 therebetween proximate each axial end of the outer ring 560. In one embodiment, grease 21 or another lubricant is disposed in the cavity 19. Referring to FIG. 1B, the outer ring 550 has two fractures F1, F2 extending axially therethrough so that the outer ring 550 defines a first segment 550A and a second segment 550B. While the outer ring 550 is shown have the two fractures F1 and F2 a one piece swaged outer ring may be employed without departing from the broader aspects disclosed herein. In one embodiment, a SpreadLock ® seal 98 (e.g., V-shaped seal) is positioned axially inward of the seal 10.

Referring to FIG. 1A, the spherical bearing 500 includes an outer ring 550 the outer ring 550 defines a spherical radially inner facing surface 551 defining a cavity 552 in the outer ring 550. The outer ring 550 defines a radially inward extending flange 553 that is spaced apart from an axially facing end 555 of the outer ring. The radially inward extending flange 553 and the axially facing end 555 define a radially inward facing groove 554. The inner ring 560 defining a spherical exterior surface 561 and having a radially outward extending flange 562 on an axial end 563A, 563B of the inner ring, the radially outward extending flange 562 defining an axially outward facing shoulder 565 and a radially outward facing shoulder 566. In one embodiment, the first axial end 10A is secured to the axially outward facing shoulder 565 and/or the radially outward facing shoulder 566. In one embodiment, the first axial end 10A slidingly engages the axially outward facing shoulder 565 and/or the radially outward facing shoulder 566.

Figure 2:
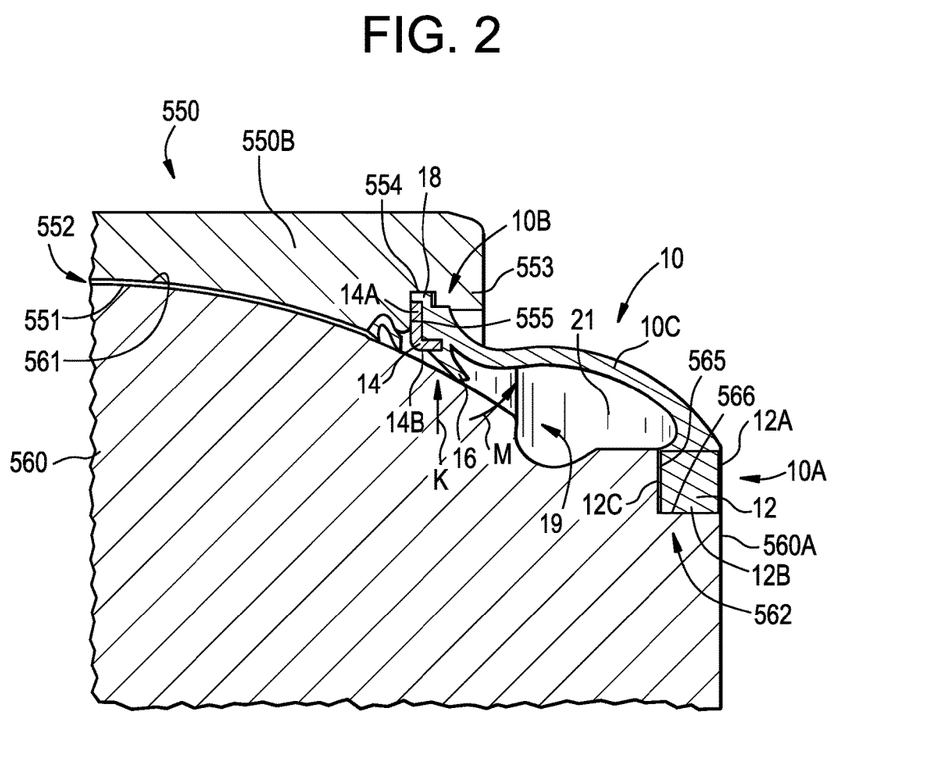
FIG. 2 is an enlarged view of the spherical bearing of FIG. 1.
Figure 3:
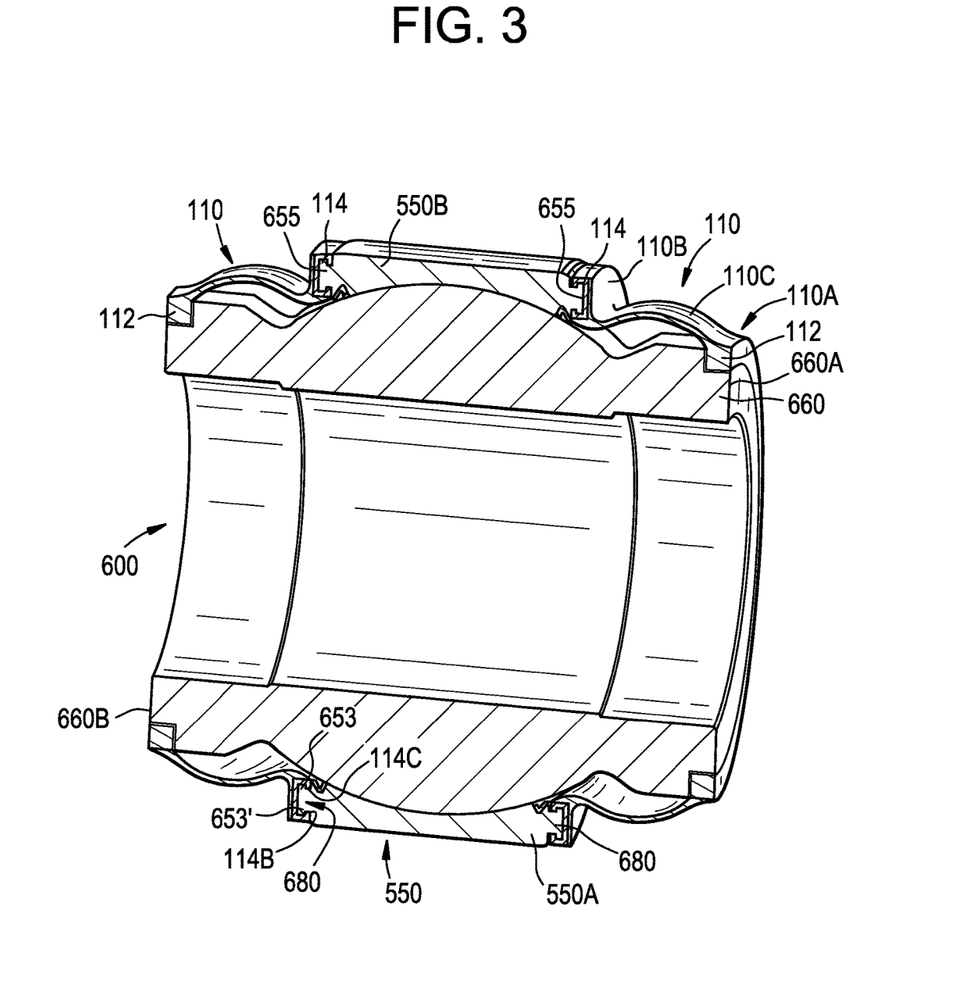
FIG. 3 is another embodiment of the spherical bearing of FIG. 1 having a C-shaped anchor.
Figure 4:
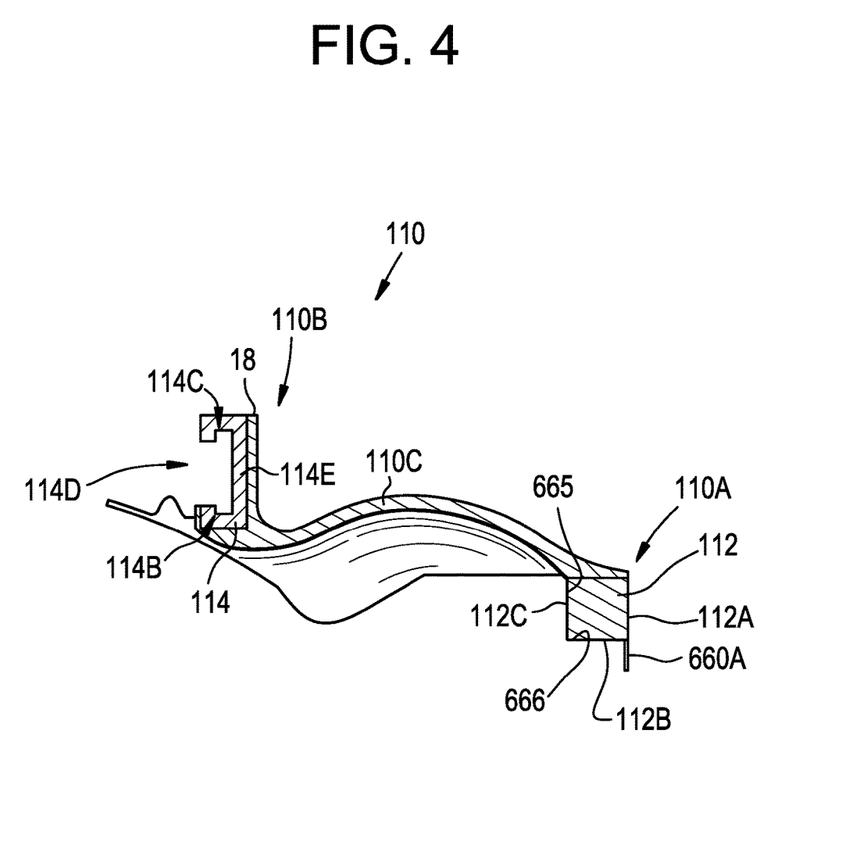
FIG. 4 is an enlarged view of the C-shaped anchor of FIG. 3.

Referring to FIGS. 1A and 2, the seal 10 includes an annular body portion 10C having an arcuate cross section extending between a first axial end 10A and a second axial end 10B. The second axial end 10B is positioned radially outward from the first axial end 10A. A first retaining ring 12 is embedded in the first axial end 10A. As illustrated in FIGS. 2-4, the first retaining ring 12 has a rectilinear cross section and is covered with an elastomeric material. For example, surrounded by an elastomeric material 12A, 12B and 12C (FIG. 2) 112A, 112B and 112C (FIG. 4). In one embodiment, the elastomeric material is nitrile. The elastomeric material 12A, 12B and 12C (FIG. 2) 112A, 112B and 112C (FIG. 4) helps frictionally engage and secure the retaining ring 12, 112 in compression with the shoulders 565, 566, 665 and 666. The first retaining ring is manufactured from a metallic material that provides sufficient stiffness and rigidity to retain the seal 10, 110, 210, 310, 410 in frictional engagement with the shoulders 565, 566, 665 and 666 during misalignment of the outer ring 550 relative to the inner ring 560.

In addition, the elastomeric material 12A, 112A on the second end 10A, 110A respectively, is flush with the respective axial end 560A, 560B, 660A or 660B of the inner ring 560 or 660, to cause debris to fall off of the seal 10, 110 and away from the radially outward facing shoulder 56 and away from the exterior surface 561.

In one embodiment, the annular body portion 10C is a boot seal manufactured from an elastomeric material, such as but not limited to rubber or nitrile. In one embodiment, second axial end 10B comprises an elastomeric material, such as but not limited to rubber or nitrile.

As shown in FIG. 2, a second retaining ring 14 is positioned proximate the second axial end 10B. A scraper seal 16 extends radially inward from the second end 10B. The scraper seal 16 has a wedge shaped cross section and is configured to scrape debris off of the spherical exterior surface 561. As shown in the embodiment of FIGS. 1A and 2, the second retaining ring 14 has an L-shaped cross section defined by an elongate first leg 14A extending radially outward and a second leg 14B extending axially outward from the first leg 14A, the first leg 14A being seated in a base portion 18 of the second axial end 10B. The base portion 18 is positioned radially outward from the first leg 14A.

The second retaining ring 14 cooperates with the base portion 18 of the second end 10A to frictionally retain the second end 10A in compression in the groove 554. In addition, the scraper seal 16 deflects against the exterior surface 561 of the inner ring 560 causing force in the direction of the arrow K and a moment as indicated by the arrow M in FIG. 2 which further maintains the second end 10B engaged in compression in the groove 554, by In addition, the second retaining ring 14 assists in securing the first segment 550A to the second segment 550B of the outer ring 550. The scraper seal 16 includes a biasing feature configured to urge the second axial end 10B radially outward upon application of a force to the scraper seal 16. The scraper seal 16 exerts a radially outward force K on the second axial end 10B to secure the second axial end 10B in the radially inward facing groove 554.

In the embodiment illustrated in FIGS. 3 and 4, the second retaining ring 114 has a C-shaped cross section, defined by a first L-shaped leg 114B and a second L-shaped leg 114C coupled to one another by a web 114E. The second retaining ring 114 has a receiving area 114D between the first L-shaped leg 114B and a second L-shaped leg 114C. The seal 110 has an annular body portion 110C that extends from a first end 110B to a second end 110A.

As shown in FIGS. 3 and 4, the axially facing end 655 of the outer ring 650 defines a T-shaped flange 680 comprising the radially inward extending flange 653 and a radially outward extending flange 653'. The second retaining ring 114 has a C-shaped cross section, defined by a first L-shaped leg 114B and a second L-shaped leg 114C coupled to one another by a web 114E, the second retaining ring 114 having a receiving area 114D between the first L-shaped leg 114B and a second L-shaped leg 114C, wherein the T-shaped head is disposed in the receiving area 114D. The C-shaped cross section and the T-shaped head cooperate in a labyrinth manner to retain the seal 10, 110 in the groove 554 and to assists in securing the first segment 550A to the second segment 550B of the outer ring 550.

Figure 5A:
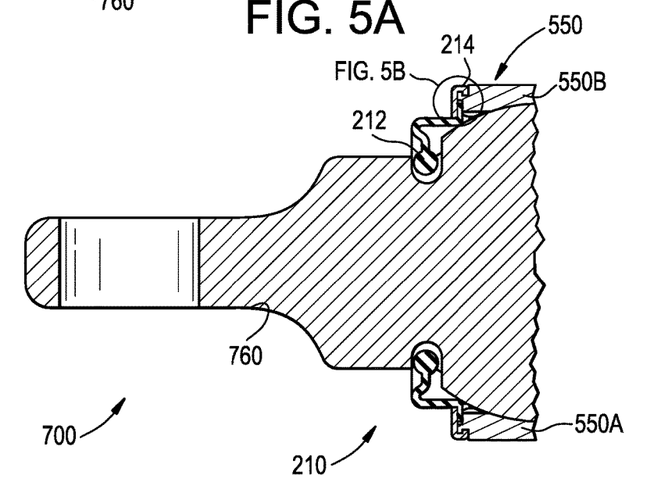
FIG. 5A is another embodiment of the spherical bearing of FIG. 1 having a J-shaped anchor.
Figure 6A:
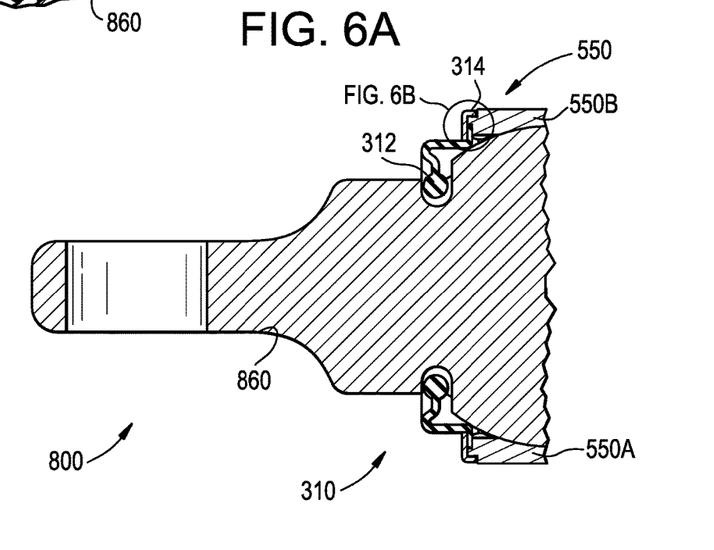
FIG. 6A is another embodiment of the spherical bearing of FIG. 1 having a L-shaped anchor.
Figure 7A:
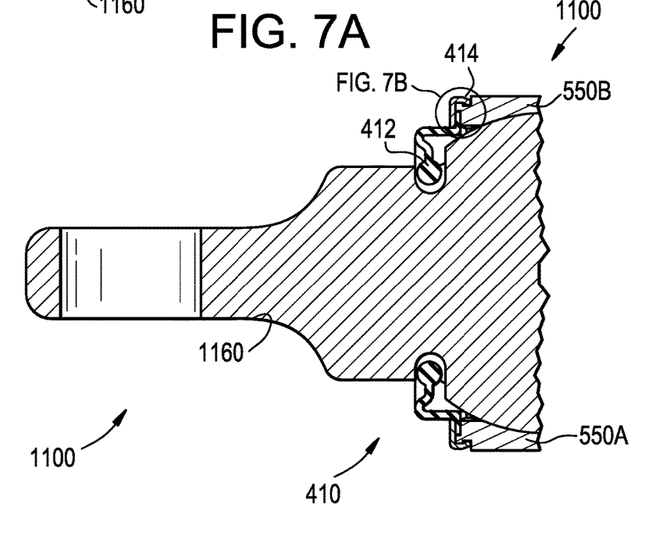
FIG. 7A is another embodiment of the spherical bearing of FIG. 1 having a bent L-shaped anchor.

In other embodiments, as shown in FIGS. 5A, 6A and 7A the first retaining ring 212,312, and 412 for the bearing 1100 has a circular cross section and comprises an elastomeric material, such as but not limited to rubber or nitrile.

Figure 5B:
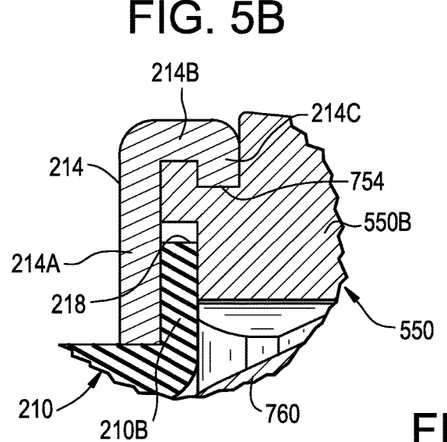
FIG. 5B is an enlarged view of the J-shaped anchor of FIG. 5A.

In one embodiment, illustrated in FIGS. 5A and 5B, the second retaining ring 214 has a J-shaped cross section defined by an elongate first leg 214A extending radially outward and transitioning into an axially directed second leg 214 and a third leg 214C extending radially inward from the second leg 214B. The outer ring 550 includes a radially outward facing groove 754 for receiving the third leg 214C. The first leg 214A compresses the second end 210B of the seal 210 against an axial end of the outer ring 550. The second end 210B of the seal 210 extends radially outward to and terminates at a circumferential edge 218 thereof. The outer ring 550 is positioned around the inner ring 760.

Figure 6B:
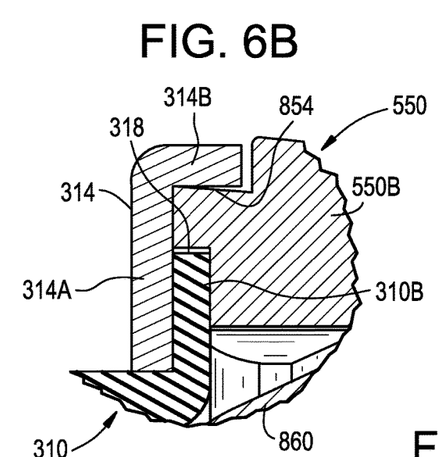
FIG. 6B is an enlarged view of the L-shaped anchor of FIG. 6A.

In one embodiment, illustrated in FIGS. 6A and 6B, the second retaining ring 314 has an L-shaped cross section defined by an elongate first leg 314A extending radially outward and transitioning into an axially directed second leg 314B. The outer ring 550 includes a radially outward facing shoulder 854 for receiving the second leg 314B. The first leg 314A compresses the second end 310B of the seal 310 against an axial end of the outer ring 550. The second end 310B of the seal 310 extends radially outward to and terminates at a circumferential edge 318 thereof. The outer ring 550 is positioned around the inner ring 860.

Figure 7B:
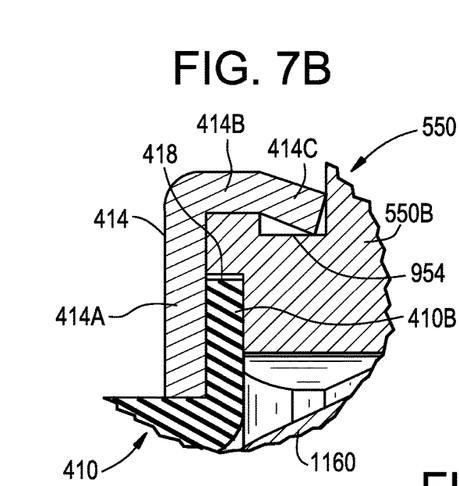
FIG. 7B is an enlarged view of the bent L-shaped anchor of FIG. 5A.

In one embodiment, illustrated in FIGS. 7A and 7B, the second retaining ring 414 for the bearing 1100 has a L-shaped cross section defined by an elongate first leg 414A extending radially outward and transitioning into an axially directed second leg 414B and a third leg 414C extending angularly inward from the second leg 414B. The outer ring 550 includes a radially outward facing groove 1154 for receiving the third leg 414C.

The first leg 414A compresses the second end 410B of the seal 410 against an axial end of the outer ring 550. The second end 410B of the seal 410 extends radially outward to and terminates at a circumferential edge 418 thereof. The outer ring 550 is positioned around the inner ring 1160.

The seals 10, 110, 210, 310 and 410, may be interchanged with any of the bearing assemblies 500 (FIG. 1A), 600 (FIG. 3), 700 (FIG. 5A), 800 (FIG. 6A) and 1100 (FIG. 7A).

Figure 8A:
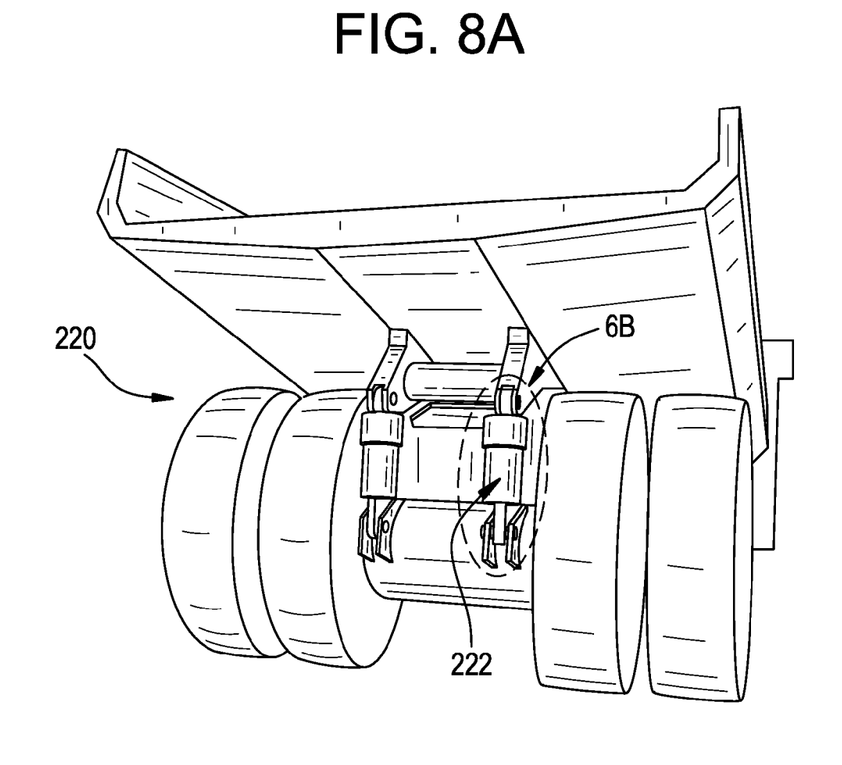
FIG. 8A is a perspective view of a rear portion of a heavy haul truck.
Figure 8B:
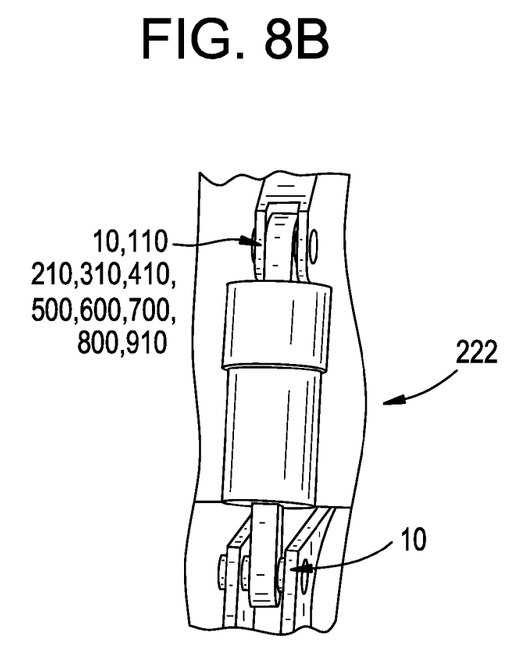
FIG. 8B is an enlarged view of a strut detail 6A of the heavy haul truck of FIG. 6A.
Figure 9:
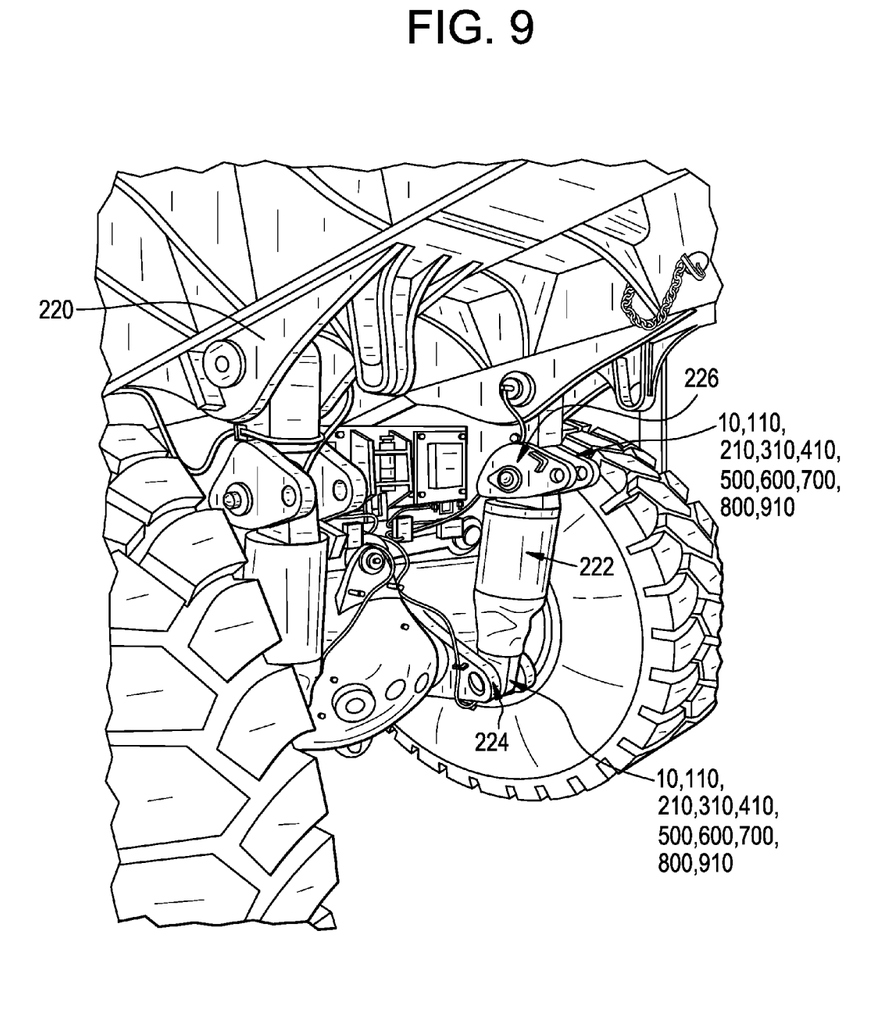
FIG. 9 is perspective view of a rear portion of a heavy haul truck illustrating rear struts.
Figure 10:
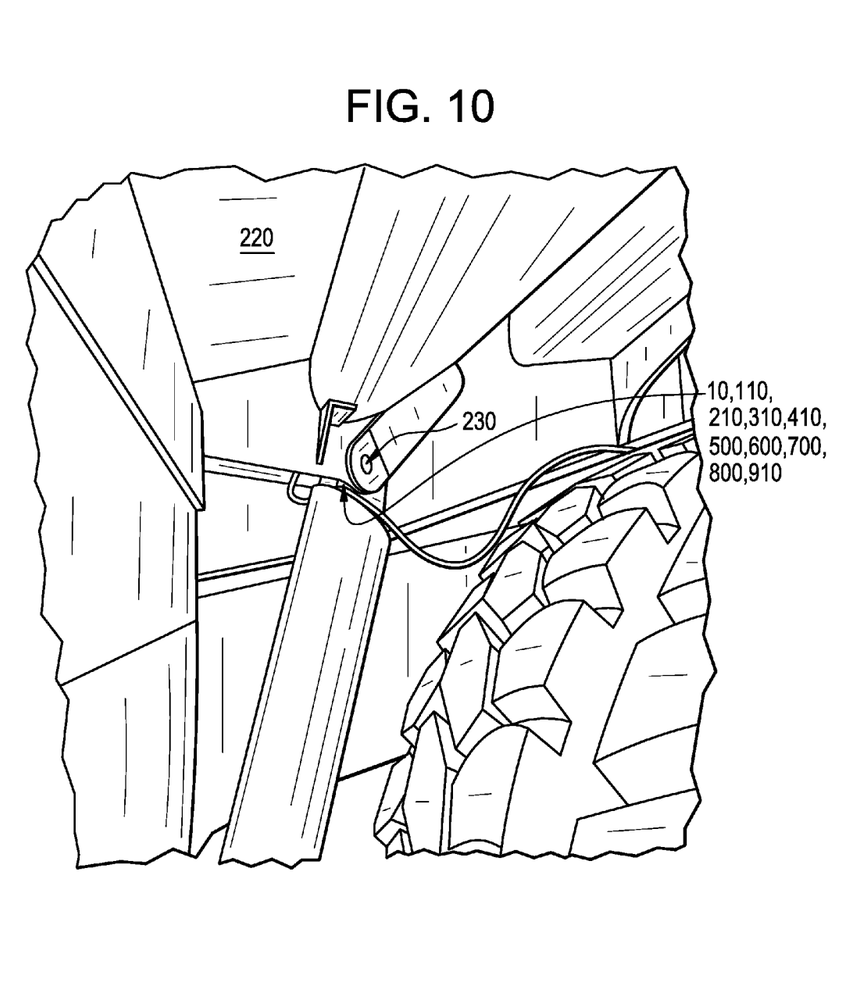
FIG. 10 is perspective view of a hoist cylinder portion of a heavy haul truck illustrating a hoist cylinder a spherical bearing.
Figure 11:
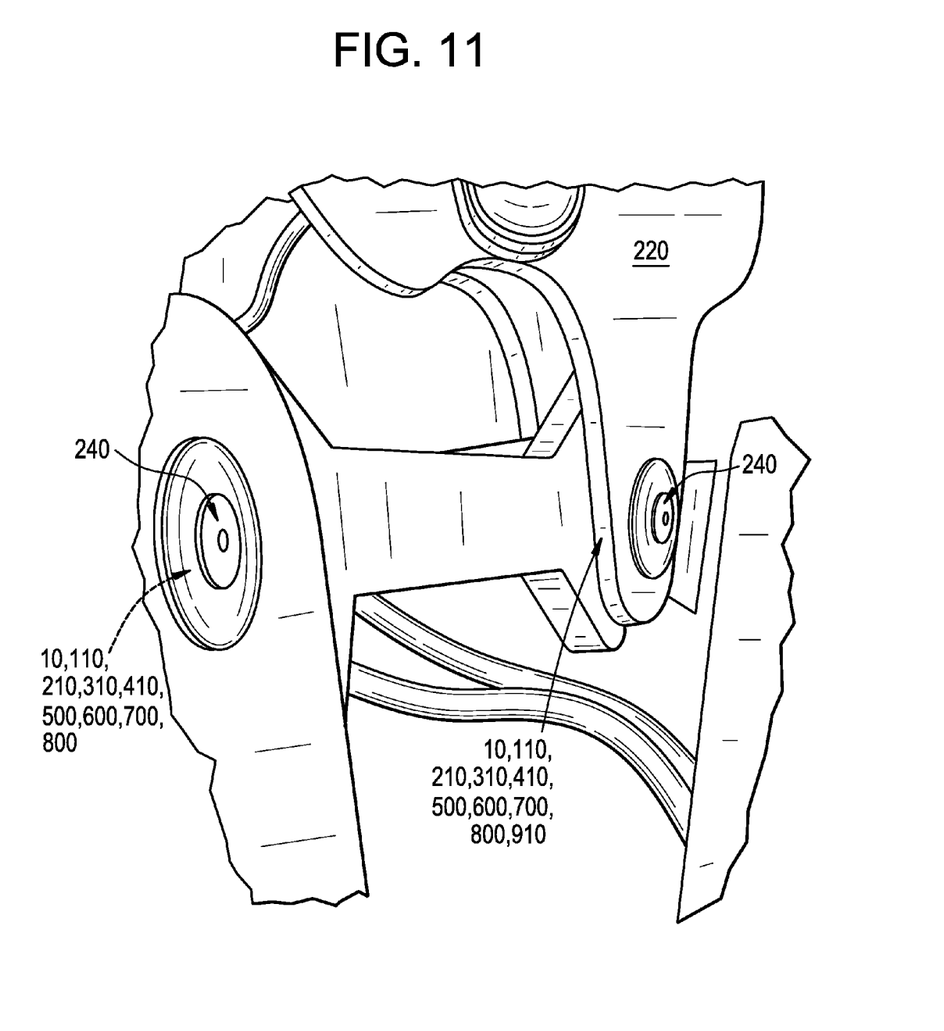
FIG. 11 is perspective view of a panhard link portion of a heavy haul truck illustrating spherical bearings.

Referring to FIGS. 8A, 8B and 9-11, the bearing assemblies 500 (FIG. 1A), 600 (FIG. 3), 700 (FIG. 5A), 800 (FIG. 6A) and 1100 (FIG. 7A) with the seals 10, 110, 210, 310 and 410 therein, respectively, may be utilized in a variety of situations and applications, including, but not limited to, bearings for vehicle suspension systems (e.g., FIGS. 8A, 8B and 9, see strut 222 and with the bearing assemblies (having the seal 10, 110) positioned in pivot connections 224 and 226) and steering systems for heavy haul trucks 220. In one embodiment, the bearing assemblies (having the seals 10 and 110) may be utilized in a suspension system and/or a steering system of mining and construction vehicles 220 for pivotally or rotationally connecting structural components to the vehicle such as, for example, struts or other telescopic dampers, hydraulic cylinders (e.g., FIG. 10 see upper hoist cylinder with a bearing (having the seal 10, 110) located in at pivot connection 230) or other mechanical and pneumatic actuators, a panhard link (e.g., FIG. 11, see panhard link 241 with bearings (having the seal 10, 110) located in pivot connections 240) or other link of a multi-link suspension system, and the like. The use of the bearing assemblies having the seals 10 and 110 is not limited in this regard as it is contemplated to use such bearing assemblies in other applications, such as, for example, military vehicles including a tank or transport vehicle, and other heavy duty equipment, such as, for example, heavy duty pick-up trucks, dump trucks, fire trucks, and the like.

Figure 12:
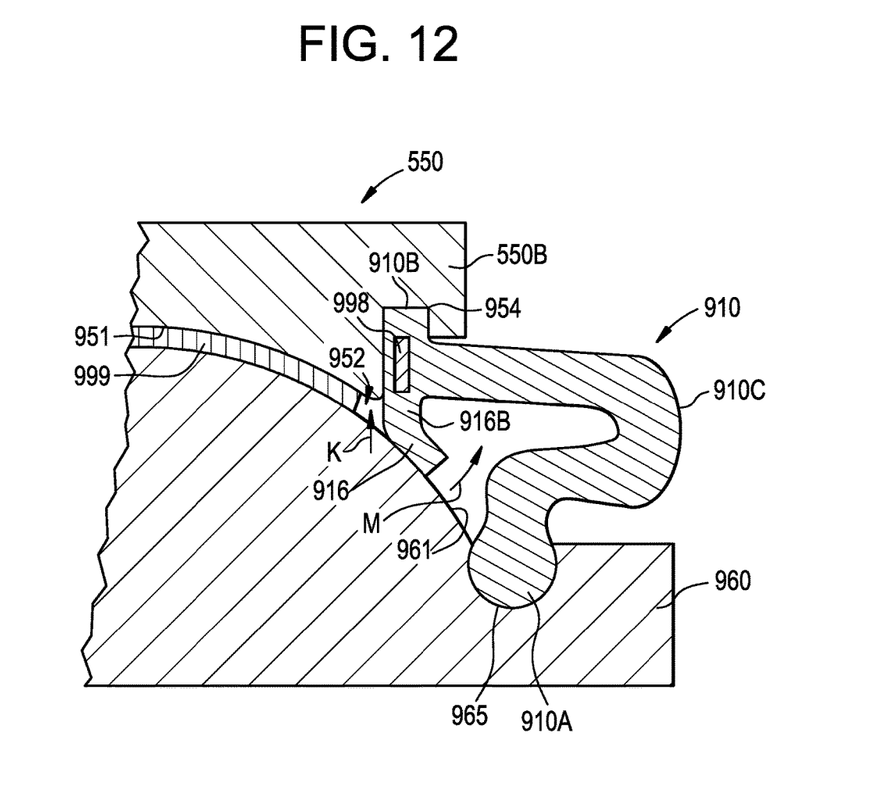
FIG. 12 is a cross sectional view of another seal embodiment having a scraper seal and shown in a compressed state installed in a bearing.
Figure 13:
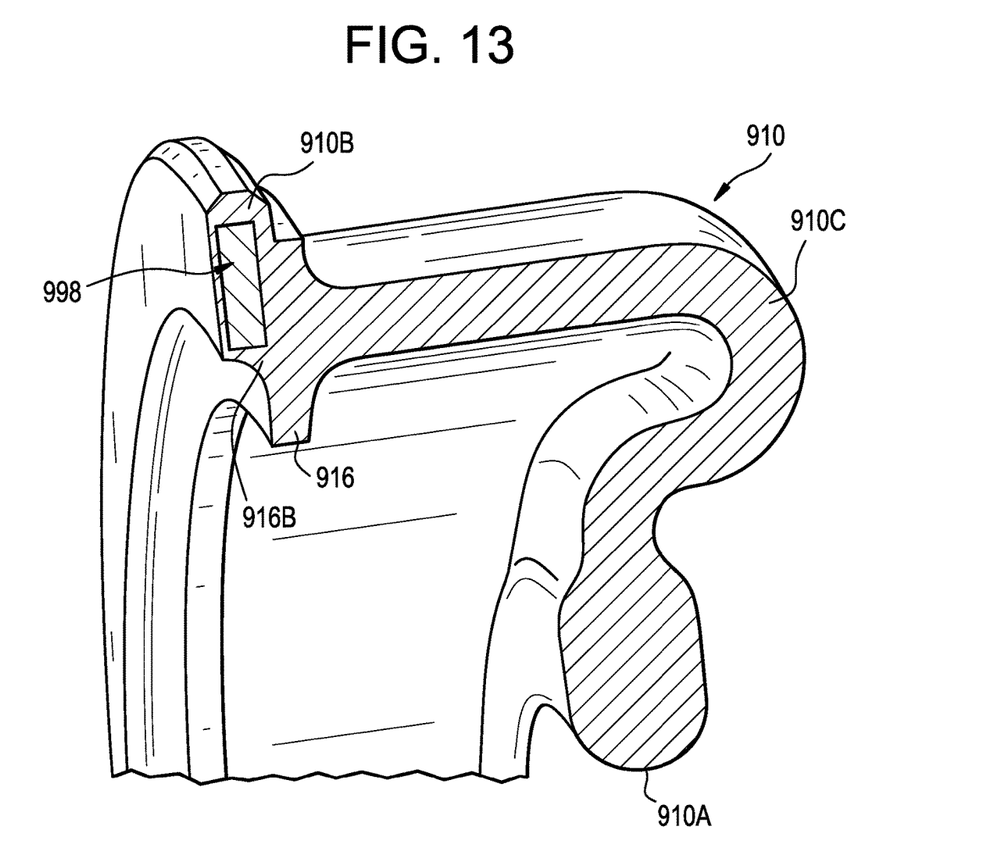
FIG. 13 is a perspective view of a section of the seal of FIG. 12 shown in a relaxed state.
Figure 14:
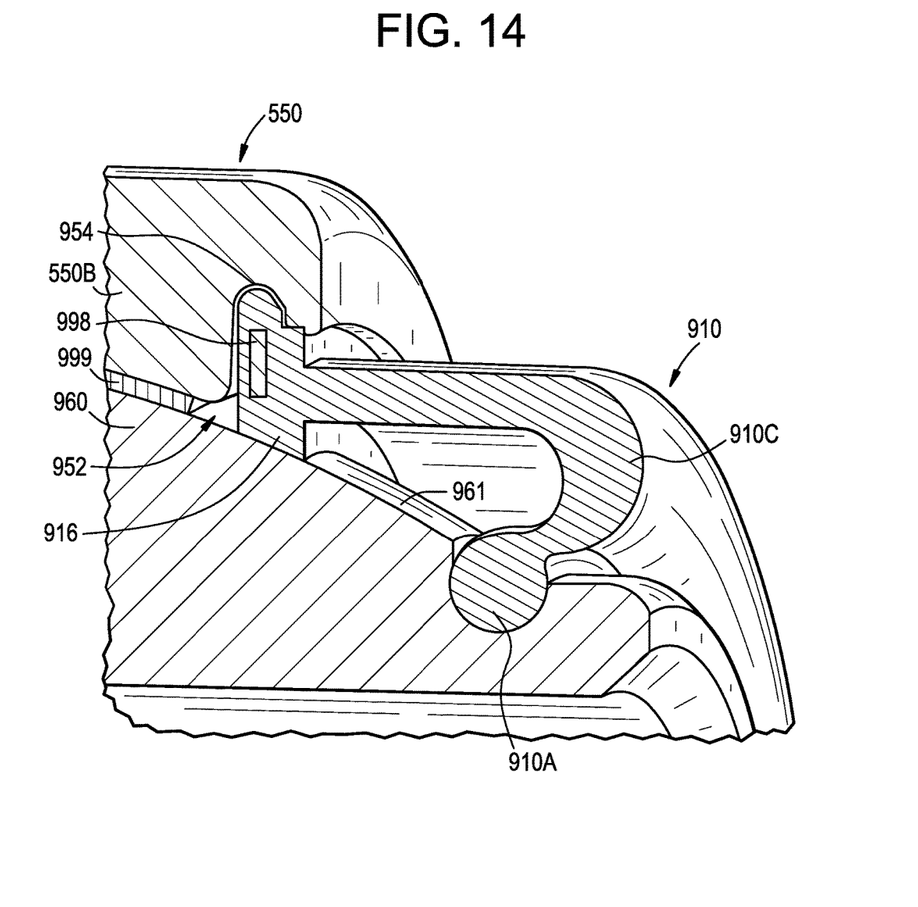
FIG. 14 is a perspective view of an embodiment of the seal of FIG. 12 shown in a compressed state installed in a bearing.

The seal 910 of FIGS. 12-14 are similar to the seal 10 of FIG. 2. Therefore, similar elements are designated with reference numbers starting with the numeral 9. The scraper seal 916 deflects against the exterior surface 961 of the inner ring 960 causing force in the direction of the arrow K and a movement as indicated by the arrow M in FIG. 12 which further maintains the second end 910B engaged in compression in the groove 954, by In addition, the second retaining ring 914 assists in securing the first segment 550A to the second segment 550B of the outer ring 550. The scraper seal is configured to scrape debris off of the exterior surface 961 by pushing or shoveling the debris axially outward during misalignment of the outer ring 550 relative to the inner ring 960 thereby preventing the debris from entering the cavity 952 between the inner ring 960 and the outer ring 550. The scraper seal 916 includes a biasing feature configured to urge the second axial end 910B radially outward upon application of a force to the scraper seal 916. The scraper seal 916 exerts a radially outward force K on the second axial end 910B to secure the second axial end 910B in the radially inward facing groove 954. As shown in FIGS. 12 and 13, the scraper seal 916 defines a base 916B that is radially aligned with the second axial end 910B and the radially inward facing groove 954. In one embodiment, a lubricious liner 999 (e.g., self lubricating liner, Polytetrafluoroethylene (PTFE)) is positioned between the exterior surface 961 and the spherical radially inner facing surface 951 of the outer ring 550.

As shown in FIG. 12, the second end 910B of the seal 910 includes a flat washer shaped (e.g., rectilinear cross section) retaining ring 998 therein. In one embodiment, the first axial end 910A slidingly engages a groove 965 formed in the inner ring 960.

In one embodiment, the first axial end 910A is secured in the groove 965. In one embodiment, the scraper seal 916 is made from an elastomeric material such as nitrile. In one embodiment, the seal 910 is made from an elastomeric material such as nitrile. In one embodiment, the scraper seal 916 is made from material that is stiffer and/or harder than the first end 910A, the annular body portion 910C and the second axial end 910B, which are made from an elastomeric material such as nitrile.

In one embodiment, the scraper seal 916 is integral with the first end 910A, the annular body portion 910C and the second axial end 910B. In one embodiment, the scraper seal 916 is manufactured separate from the first end 910A, the annular body portion 910C and the second axial end 910B and a base portion 916B (FIG. 12) is secured to a portion of the seal 910 proximate the second axial end 910B via a suitable bonding method.

Although the present invention has been disclosed and described with reference to certain embodiments thereof, it should be noted that other variations and modifications may be made, and it is intended that the following claims cover the variations and modifications within the true scope of the invention.

What is claimed is:

1. A seal for a spherical bearing, the seal comprising:
   an annular body portion having an arcuate cross section extending between a first axial end and a second axial end, the second axial end being positioned radially outward from the first axial end;
   a scraper seal extending radially inward from the second axial end;
   the scraper seal being configured to scrape debris off of a bearing surface; and
   the scraper seal being configured such that when the seal is assembled into a bearing, a force is applied to the scraper seal that urges the second axial end radially outward to secure the second axial end in the spherical bearing and such that the scraper seal is stiffer than the first axial end, the annular body portion and the second axial end.

2. The seal according to claim 1, wherein the seal comprises an elastomeric material.

3. The seal according to claim 1, further comprising a first retaining ring positioned proximate the first axial end, wherein the first retaining ring is embedded in the first axial end and has one of a rectilinear cross section and a circular cross section and the first retaining ring being covered with an elastomeric material.

4. The seal according to claim 3, further comprising a second retaining ring positioned proximate the second axial end, the second retaining ring having one of a rectilinear cross section, an L-shaped cross section, a J-shaped cross section and a C-shaped cross section.

5. A spherical bearing comprising:
   an outer ring defining a spherical radially inner facing surface defining a cavity in the outer ring;
   an inner ring defining a spherical exterior surface, the inner ring being positioned at least partially in the cavity;
   a seal extending between the inner ring and the outer ring, the seal comprising:
   an annular body portion having an arcuate cross section extending between a first axial end and a second axial end, the second axial end being positioned radially outward from the first axial end;
   a scraper seal extending radially inward from the second axial end;
   the scraper seal being configured to scrape debris off of a bearing surface; and
   the scraper seal being configured such that when the seal is assembled into a bearing, a force is applied to the scraper seal that urges the second axial end radially outward to secure the second axial end in the spherical bearing and such that the scraper seal is stiffer than the first axial end, the annular body portion and the second axial end.

6. The spherical bearing of claim according to claim 5, wherein the seal comprises an elastomeric material.

7. The spherical bearing of claim 5, wherein the outer ring defines a radially inward extending flange that is spaced apart from an axially facing end of the outer ring, the radially inward extending flange and the axially facing end defining a radially inward facing groove.

8. The spherical bearing of claim 5, further comprising a first retaining ring positioned proximate the first axial end, the first retaining ring is embedded in the first axial end and the first retaining ring has one of an arcuate cross section and a rectilinear cross section and the first retaining ring being covered with an elastomeric material.

9. The spherical bearing according to claim 8, further comprising a second retaining ring positioned proximate the second axial end the second retaining ring having one of a rectilinear cross section, an L-shaped cross section, a J-shaped cross section and a C-shaped cross section.

10. The spherical bearing of claim 5, wherein the inner ring has a radially outward extending flange on an axial end thereof, the radially outward extending flange defining an axially outward facing shoulder and a radially outward facing shoulder;
    the first axial end is secured to at least one of the axially outward facing shoulder and the radially outward facing shoulder; and
    the first axial end is flush with the axial end of the inner ring so that debris falls off of the seal and away from the radially outward facing shoulder and away from the spherical exterior surface.

11. The spherical bearing of claim 5, wherein the inner ring has a radially outward extending flange on an axial end thereof, the radially outward extending flange defining an axially outward facing shoulder and a radially outward facing shoulder; and
    the first axial end slidingly engages at least one of the axially outward facing shoulder and the radially outward facing shoulder.

12. The spherical bearing of claim 5, wherein the scraper seal defines a base that is radially aligned with the second axial end and a radially inward facing groove.

13. The spherical bearing of claim 5, wherein the outer ring comprises at least two axially extending fractures therethrough so that the outer ring defines a first segment and a second segment.

* * * * *